(12) United States Patent
Chan et al.

(10) Patent No.: US 8,863,008 B2
(45) Date of Patent: Oct. 14, 2014

(54) AUTOMATIC REMOVAL OF SENSITIVE INFORMATION FROM A COMPUTER SCREEN

(75) Inventors: Yuk Chan, Poughkeepsie, NY (US); Tin H. To, Poughkeepsie, NY (US); Andrew Tsang, Poughkeepsie, NY (US); Wei Zhou, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 12/707,130

(22) Filed: Feb. 17, 2010

(65) Prior Publication Data

US 2011/0202850 A1    Aug. 18, 2011

(51) Int. Cl.
| | | |
|---|---|---|
| G06F 3/00 | (2006.01) | |
| G09G 5/00 | (2006.01) | |
| G06F 21/84 | (2013.01) | |
| G06F 21/60 | (2013.01) | |

(52) U.S. Cl.
CPC ...... G06F 21/606 (2013.01); *G06F 2221/2143* (2013.01); *G06F 21/84* (2013.01)
USPC ............ 715/751; 715/745; 715/759; 345/626

(58) Field of Classification Search
CPC  G06F 2221/2143; G06F 21/606; G06F 21/84
USPC .................. 715/741, 759, 751, 745; 345/626
See application file for complete search history.

(56) References Cited

U.S. PATENT DOCUMENTS

| | | | | |
|---|---|---|---|---|
| 5,727,155 A | * | 3/1998 | Dawson ........................ | 709/205 |
| 6,002,427 A | * | 12/1999 | Kipust .......................... | 348/156 |
| 7,200,592 B2 | | 4/2007 | Goodwin et al. | |
| 7,305,381 B1 | | 12/2007 | Poppink et al. | |
| 7,467,164 B2 | | 12/2008 | Marsh | |
| 7,580,930 B2 | | 8/2009 | Brave et al. | |
| 7,639,898 B1 | * | 12/2009 | Chan ............................. | 382/305 |
| 2003/0179283 A1 | | 9/2003 | Seidel et al. | |
| 2004/0218036 A1 | * | 11/2004 | Boss et al. ................. | 348/14.08 |
| 2006/0129948 A1 | * | 6/2006 | Hamzy et al. ................. | 715/790 |
| 2007/0067852 A1 | * | 3/2007 | James ............................ | 726/28 |
| 2008/0097985 A1 | | 4/2008 | Olstad et al. | |
| 2010/0205667 A1 | * | 8/2010 | Anderson et al. ............... | 726/19 |
| 2010/0313239 A1 | * | 12/2010 | Chakra et al. ..................... | 726/2 |
| 2011/0154219 A1 | * | 6/2011 | Khalatian ..................... | 715/751 |
| 2012/0011451 A1 | * | 1/2012 | Bansal et al. ................. | 715/753 |
| 2012/0036452 A1 | * | 2/2012 | Coleman et al. ............. | 715/751 |
| 2013/0212490 A1 | * | 8/2013 | Scherpa, Josef ............. | 715/753 |

OTHER PUBLICATIONS

McLachlan et al., LiveRAC: Interactive Visual Exploration of System Management Time-Series Data, Apr. 5-10, 2008, pp. 1483-1492, CHI 2008 Proceedings, ACM, Florence, Italy.

Liapis, Synergy: A Prototype Collaborative Environment to Support the Conceptual Stages of the Design Process, 2008, pp. 149-156, Social and Collaborative Spaces, 3rd International Conference on Digital Interactive Media in Entertainment and Arts, DIMEA.

* cited by examiner

*Primary Examiner* — Kieu Vu
*Assistant Examiner* — Aaron Lowenberger
(74) *Attorney, Agent, or Firm* — Cantor Colburn LLP; William A. Kinnaman, Jr.

(57) ABSTRACT

A method for automatic censoring of a graphical user interface (GUI) screen includes receiving a censoring trigger by a censoring module; identifying information present in the GUI screen by a object recognition module; comparing the identified information with a set of preferences stored in a censoring preferences module to determine content to be removed from the GUI screen; and removing the determined content from the GUI screen by the censoring module.

11 Claims, 6 Drawing Sheets

200
```
DETERMINE AND STORE CENSORING PREFERENCES
201
```
```
RECEIVE CENSORING TRIGGER
202
```
```
IDENTIFY INFORMATION PRESENT IN SCREEN
203
```
```
DETERMINE CONTENT TO BE CENSORED FROM THE IDENTIFIED INFORMATION
204
```
```
REMOVE DETERMINED CONTENT FROM SCREEN
205
```
FIG. 2

300

SCREEN CENSOR INTERFACE

| SHARE WITHOUT METADATA | SHARE WITH METADATA | | CONFIGURATION |
|---|---|---|---|
| | 308 | | |

MYSCREEN  301

○ MY ACCOUNT  302

URL | http://myaccount.ibm.com/answers/threadview/id/70066.html  303

Log In

SSN or Customer ID: | 000-00-0000  304

PIN: | 1234

○ My Benefits  305

View My Accounts

Member Number: | Patrick

Sign In  306

○ myConfidential.txt - Notepad

ID: Patrick
Pwd: MyPwd

Investment Choice
 -Fund drop by 50% fund: 20
 -Fund drop by 45% fund: 30

Available Data  307

Internet Explorer
▫ Title - My Account
▫ URL
▫ SSN or Customer ID
▫ PIN

My Benefits
▫ Title: View My Accounts
▫ Member Number: Patric

Notepad
▫ Title: myConfidential.txt
▫ Body Text:
   ID: Patrick
   Pwd: MyPwd

Investment Choice
    -Fund drop by 50% fund: 20
    -Fund drop by 45% fund: 30

| SELECT ALL | SELECT NONE |

○ MY ACCOUNT  402

URL  http://myaccount.ibm.com/answers/threadview/id/70066.html  403

Log In

SSN or Customer ID: [           404           ]

PIN: [    ]    405

○ myConfidential.txt - Notepad

ID:    406
Pwd:
Investment Choice
 -Fund drop by 50% fund: 20
 -Fund drop by 45% fund: 30

```
AUTOMATIC SCREEN CENSOR- CONFIGURATION

Remove windows when:
□ Title: My Account
□ Author: !=Patric                501
□ Text: MyBenfits, Confidential Blackout or remove text when:
□ Hyperlinked to: http://account.mybank.com
□ Text: "password"; "pwd"
□ Similar Image: /home/myimg1.jpg Provide warning
□ Hyperlinked to: http://mypage.ibm.com
□ Text: "social security number"
□ Similar Image: /home/myimg2.jpg    502
                                  ┌──────┐
                                  │ SAVE │
                                  └──────┘
```

FIG. 5

AUTOMATIC REMOVAL OF SENSITIVE INFORMATION FROM A COMPUTER SCREEN

BACKGROUND

This disclosure relates generally to the field of removing sensitive information from a computer screen.

In a communication session such as a web conference or chat session, a participant may send a screen share of a graphical user interface (GUI) that is displayed on the participant's computer screen to other participants in the communication session. The screen share may inadvertently include confidential or personal information belonging to the sender. Therefore, sending the screen share to other parties, such as co-workers or customers, may be potentially embarrassing to the sender, or may represent a security risk. Sensitive information may also be inadvertently communicated to an unauthorized party if the unauthorized party views a user's computer screen. The user may have a browser open in their screen that contains, for example, their bank account or 401k information, and forget to close the browser before a meeting in which the screen is viewed by others. The screen may also be shared during a public presentation, resulting in a large number of outside parties viewing the sensitive information.

SUMMARY

An exemplary embodiment of a method for automatic censoring of a graphical user interface (GUI) screen includes receiving a censoring trigger by a censoring module; identifying information present in the GUI screen by a object recognition module; comparing the identified information with a set of preferences stored in a censoring preferences module to determine content to be removed from the GUI screen; and removing the determined content from the GUI screen by the censoring module.

An exemplary embodiment of a system for automatic censoring of a graphical user interface (GUI) screen includes a censoring module configured to receive a censoring trigger; an object recognition module configured to identify information present in the GUI screen; and a censoring preferences module configured store a set of preferences regarding content to be removed from the GUI screen; wherein the censoring module is further configured to compare the identified information with the set of preferences to determine content to be removed from the GUI screen, and to remove the determined content from the GUI screen.

An exemplary embodiment of a computer program product comprising a computer readable storage medium containing computer code that, when executed by a computer, implements a method for automatic screen censoring, wherein the method includes receiving a censoring trigger by a censoring module; identifying information present in the GUI screen by a object recognition module; comparing the identified information with a set of preferences stored in a censoring preferences module to determine content to be removed from the GUI screen; and removing the determined content from the GUI screen.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 2 illustrates an embodiment of a method for automatic screen censoring.

FIG. 3 illustrates an embodiment of a GUI screen having an automatic censoring interface.

FIG. 4 illustrates an embodiment of a censored GUI screen.

FIG. 5 illustrates an embodiment of a user interface for determining automatic screen censoring preferences.

DETAILED DESCRIPTION

Embodiments of systems and methods for automatic screen censoring are provided, with exemplary embodiments being discussed below in detail.

Automatic screen censoring, or removal of sensitive information from a computer screen, may be implemented by automatically removing data that is designated as sensitive by a user from the user's screen. Automatic screen censoring may be applied in response to a trigger, including but not limited to a push of a button by the user, facial recognition software determining that an unauthorized person is viewing the user's screen, connection of the computer to a projection device, launching of a presentation, or sending of a screen share.

To censor a user's screen, object recognition technology, including but not limited to object maps, screen scraping, or optical character recognition (OCR), may be applied to the screen to determine the information present in the screen. The determined information may include both visible information and metadata. This determined information may then be compared to a set of user preferences to determine which portions of the screen comprise sensitive information to be censored. Granular censorship of information may be performed at the level of the contextual information determined by the object recognition technology; all or any part of the information in a particular application may be removed. Data located outside of but related to a shared region may also be used to determine whether to censor information located inside the shared region.

Figure 1:
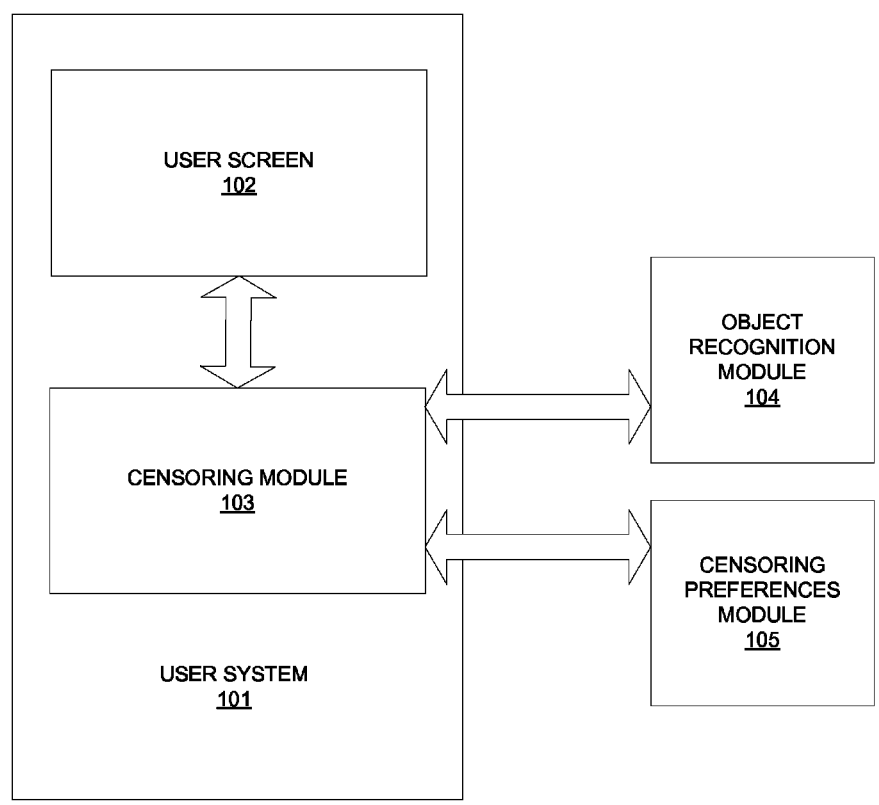
FIG. 1 illustrates an embodiment of a system for automatic screen censoring.

FIG. 1 illustrates an embodiment of a system 100 comprising automatic screen censoring. User screen 102 resides on user system 101, which may comprise any appropriate computing system. User screen 102 may comprise a GUI screen comprising various objects, including but not limited to application windows or icons. User system 101 further comprises a censoring module 103 in communication with object recognition module 104 and censoring preferences module 105. Object recognition module 104 and censoring preferences module 105 are shown for illustrative purposes only; in various embodiments, object recognition module 104 and censoring preferences module 105 may reside on user system 101, or on an external system in communication with user system 101 via a network.

The preferences stored in censoring preferences module 105 may designate various types of content as sensitive content that the user may wish to have removed from GUI screen 102. These preferences may be default values, or may be configured by the user or by an organization such as a user's employer. Censorable data may include any desired type of content that may be located in GUI screen 102, including but not limited to any text, GUI constructs, uniform resource identifier (URI), or images, and may relate to any information the user considers to be personal or sensitive, such as banking information, instant messaging conversations, or webpages that the user may view that the user does not wish to share with other parties. The preferences may designate strings that indicate censorable material, such as "Confidential", "SSN", "password" or "Social Security Number". The user preferences may also comprise an image; if the object recognition module 104 detects an image in user screen 102 that is similar to the image designated in the preferences, the image may be censored from the user screen 102. Censorship preferences may be based on collaborative knowledge, such as social network relationships or corporate policy, and individual preference.

Censorship preferences may vary based on the identity of a person viewing the information, such as chat partner, viewer of a screen, or participant in a web conference. Different viewing schemes may be applied to different participants in a web conference. The user may define various viewing schemes in the preferences, such "View Everything" or "Show only Information Bob can see" scheme. In an example "Show only Information Bob can see" scheme, an application in the screen 102 may be minimized or blacked out if the content in the application is designated as confidential and doesn't have Bob's name on it. This may be integrated with a webcam employing facial recognition technology to automatically switch the viewing scheme if it is detected that Bob is viewing the screen 102.

FIG. 2 illustrates an embodiment of a method 200 for automatic screen censoring. FIG. 2 is discussed with reference to FIG. 1. In block 201, preferences regarding the types of information to be censored are determined and stored in censoring preferences module 105. In block 202, a censor trigger is received by the censoring module 103. The trigger may include but is not limited to a push of a button by the user, facial recognition software determining the viewing of the user's screen by another person, connection of the computer to a projection device, launching of a presentation, or sending of a screen share. In a screen sharing scenario, the user may select a region of screen to be shared; the region may include the entire screen or a portion of the screen. In block 203, information, including metadata, is identified regarding objects located in the user screen 102 by object recognition module 104. For a screen share, if less than the entire user screen 102 is to be shared, information regarding objects inside the share region, and information located outside of the share region that is relevant to the share region, may be identified. Object recognition module 104 may comprise object maps, which may traverse all objects in GUI screen 102 using any appropriate type of GUI element navigation technology, such as Rational Function Tester or Spy++. Text mining may be also employed by object recognition module 104 to determine strings that are present in the objects on user screen 102. In block 204, censoring module 103 determines sensitive content to be censored from the information identified in block 203. This determination is made by comparing the information gathered by object recognition module 104 with the censoring preferences stored in censoring preferences module 105. Some types of sensitive content may trigger a warning to the user, allowing the user to choose whether or not to censor the content based on the warning. The user's response to a warning may be added to the preferences stored in censoring preferences module 105 in some embodiments. The user may also be presented with a list of information gathered from the screen 102, allowing the user to select content to be censored. These selections may be stored in censoring preferences module 105 in some embodiments. Some types of content in GUI screen 102 are automatically removed without warning the user, or for certain types of triggers, such as a notification from a webcam that an unauthorized person is viewing the GUI screen 102, no warnings may be provided. In block 205, the sensitive content determined in block 204 is removed from screen 102. Removal may comprise minimizing or removal of a window or region containing the sensitive information, or black-out or replacement of the sensitive information, leaving the window visible.

FIG. 3 illustrates an embodiment of a user interface 300 for automatic screen censoring. User interface 300 may be displayed to the user as part of step 204 of FIG. 2, to allow the user to choose the information to be censored. User interface 300 shows user screen 301, which contains web browser window 302 (comprising URL 303 and SSN field 304), My Benefits window 305, and Notepad window 306. Information collected from windows 302, 305, and 306 by object recognition module 104 is displayed in available data window 307. The user may use checkboxes to select any of the information listed in available data window 307 to be censored by censoring module 103. The selected information may be added to the preferences stored in censoring preferences module 105. User interface 300 is shown for illustrative purposes only; various embodiments of automatic screen censoring may employ any appropriate user interface, or may apply the user preferences stored in censoring preferences module 105 without displaying a user interface.

FIG. 4 illustrates an embodiment of a censored screen 400. In censored screen 400, URL 403 is visible in browser window 402, but SSN field 404 has been cleared. Also, information has been removed from windows 405 and 406. Censored screen 400 is shown for illustrative purposes only; a censored screen may have any amount or type of content removed in any appropriate manner, including minimizing, replacement, or blacking out.

FIG. 5 illustrates an embodiment of a user interface 500 for setting a user's censoring preferences. User interface 500 shows various types of information 501 that may be present in a user screen, such as title string, author, images, or text. The user may edit the information 501 and check or uncheck any of the boxes associated with information 501 to designate which information will be censored. The user's preferences may then be stored in censoring preferences module 105 by clicking the save button 502. User interface 500 is shown for illustrative purposes only; the user preferences to be stored in censoring preferences module 105 may be determined in any appropriate manner.

Figure 6:
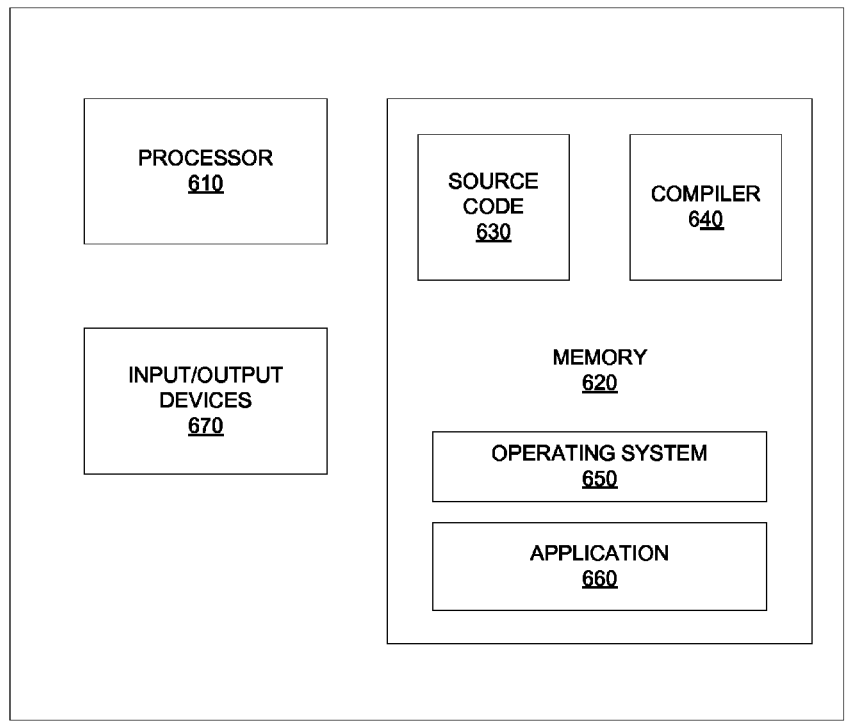
FIG. 6 illustrates an embodiment of a computer that may be used in conjunction with systems and methods for automatic screen censoring.

FIG. 6 illustrates an example of a computer 600 which may be utilized by exemplary embodiments of systems and methods for automatic screen censoring as embodied in software. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. The computer readable medium can be, for example but not limited to, an electronic, magnetic, optical, electromagnetic, infrared, or semiconductor system, apparatus, device medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include automatic prevention of viewing of sensitive information by unauthorized parties.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for automatic censoring of a graphical user interface (GUI) screen of a computer, the method comprising:
    receiving a censoring trigger by a censoring module of the computer;
    identifying information present in the GUI screen of the computer by an object recognition module;
    comparing, by the censoring module of the computer, the identified information with a set of preferences stored in a censoring preferences module to automatically determine a first piece of the identified information to be removed from the GUI screen of the computer;
    displaying a list of the identified information to a user;
    receiving a selection from the user of a second piece of the identified information from the list;
    removing the first piece of the identified information and the second piece of the identified information from the GUI screen of the computer by the censoring module;
    adding the second piece of information to the set of preferences in the censoring preferences module;
    receiving a censoring trigger by the censoring module, wherein the censoring trigger comprises a screen share of the GUI screen, and wherein the screen share comprises sharing a region of the GUI screen of the computer that is less than the entire GUI screen of the computer; and
    removing from the GUI screen a third piece of information corresponding to the second piece of information by the censoring module based on the adding of the selected piece of information to the set of preferences in the censoring preferences module, wherein the first piece of the identified information is removed from the screen share based on information that was identified in the GUI screen by the object recognition module and that is located in a portion of the GUI screen of the computer outside of the shared region.

2. The method of claim 1, wherein the identified information comprises metadata regarding objects in the GUI screen, and information is removed from the GUI screen based on the metadata regarding the objects in the GUI screen.

3. The method of claim 1, wherein the identified information comprises a first image, and the preferences comprise a second image; and
    wherein the first image is removed from the GUI screen by the censoring module based on the second image.

4. The method of claim 1, wherein removing the determined information comprises minimizing a window comprising the information.

5. The method of claim 1, wherein removing the determined information comprises closing a window comprising the information.

6. A computer system for automatic censoring of a graphical user interface (GUI) screen of a computer, the computer system comprising:
    a display, the display comprising the GUI screen of the computer; and
    a processor of the computer, the processor configured to:
        receive a censoring trigger by a censoring module of the computer;
        identify information present in the GUI screen of the computer by an object recognition module;
        compare, by the censoring module of the computer, the identified information with a set of preferences stored in a censoring preferences module to automatically determine a first piece of he identified information to be removed from the GUI screen of the computer;
        display a list of the identified information to a user;
        receive a selection from the user of a second piece of the identified information from the list;
        remove the first piece of the identified information and the second piece of the identified information from the GUI screen of the computer by the censoring module;
        add the second piece of information to the set of preferences in the censoring preferences module;
        receive a censoring trigger by the censoring module, wherein the censoring trigger comprises a screen share of the GUI screen, and wherein the screen share comprises sharing a region of the GUI screen of the computer that is less than the entire GUI screen of the computer; and
        remove from the GUI screen a third piece of information corresponding to the second piece of information by the censoring module based on the adding of the selected piece of information to the set of preferences in the censoring preferences module, wherein the first piece of the identified information is removed from the screen share based on information that was identified in the GUI screen by the object recognition module and that is located in a portion of the GUI screen of the computer outside of the shared region.

7. The system of claim 6, wherein the identified information comprises metadata regarding objects in the GUI screen, and information is removed from the GUI screen based on the metadata regarding the objects in the GUI screen.

8. The system of claim 6, wherein the identified information comprises a first image, and the preferences comprise a second image; and
    wherein the first image is removed from the GUI screen by the censoring module based on the second image.

9. The system of claim 6, wherein removing the determined information comprises minimizing a window comprising the information.

10. The system of claim 6, wherein removing the determined information comprises closing a window comprising the information.

11. A computer program product comprising a non-transitory computer readable storage medium containing computer code that, when executed by a computer, implements a method for automatic censoring of a graphical user interface (GUI) screen of a first computer, wherein the method comprises:

receiving a censoring trigger by a censoring module of the computer;

identifying information present in the GUI screen of the computer by an object recognition module;

comparing, by the censoring module of the computer, the identified information with a set of preferences stored in a censoring preferences module to automatically determine a first piece of the identified information to be removed from the GUI screen of the computer;

displaying a list of the identified information to a user;

receiving a selection from the user of a second piece of the identified information from the list;

removing the first piece of the identified information and the second piece of the identified information from the GUI screen of the computer by the censoring module;

adding the second piece of information to the set of preferences in the censoring preferences module;

receiving a censoring trigger by the censoring module, wherein the censoring trigger comprises a screen share of the GUI screen, and wherein the screen share comprises sharing a region of the GUI screen of the computer that is less than the entire GUI screen of the computer; and removing from the GUI screen a third piece of information corresponding to the second piece of information by the censoring module based on the adding of the selected piece of information to the set of preferences in the censoring preferences module, wherein the first piece of the identified information is removed from the screen share based on information that was identified in the GUI screen by the object recognition module and that is located in a portion of the GUI screen of the computer outside of the shared region.

* * * * *